(12) United States Patent
Barton et al.

(10) Patent No.: US 7,913,239 B2
(45) Date of Patent: Mar. 22, 2011

(54) METHOD AND APPARATUS FOR A PROGRAMMING FRAMEWORK FOR PATTERN MATCHING AND TRANSFORMATION OF INTERMEDIATE LANGUAGE EXPRESSION TREES

(75) Inventors: Christopher Mark Barton, Edmonton (CA); Arie Tal, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 1779 days.

(21) Appl. No.: 11/075,091

(22) Filed: Mar. 8, 2005

(65) Prior Publication Data
US 2006/0206876 A1 Sep. 14, 2006

(51) Int. Cl.
*G06F 9/45* (2006.01)
(52) U.S. Cl. .................. 717/146; 717/140; 717/143
(58) Field of Classification Search .................. None
See application file for complete search history.

(56) References Cited

U.S. PATENT DOCUMENTS

| | | | | |
|---|---|---|---|---|
| 5,586,020 | A | 12/1996 | Isozaki | 395/707 |
| 6,292,938 | B1 | 9/2001 | Sarkar et al. | 717/6 |
| 6,463,582 | B1 | 10/2002 | Lethin et al. | 717/158 |
| 7,543,015 | B2 * | 6/2009 | Vion-Dury et al. | 709/200 |

OTHER PUBLICATIONS

Josef Grosch, "Transformation of Attributed Trees Using Pattern Matching", 1992, Lecture Notes in Computer Science, vol. 641.*
Ilyas Cicekli, "Selecting Choice Points in an Intelligent Backtracking Schema", 1994, of the 9th International Symposium on Computer and Information Sciences (ISCIS-IX), Antalya, Turkey.*
Ilyas Cicekli, "Variable Ages in a WAM Based System", 1995, Proceedings of the 4th Turkish Symposium on Artificial Intelligence and Neural Networks (TAINN95), Istanbul, Turkey.*
Ilyas Cicekli, "An Intelligent Backtracking Schema in a Logic Programming Environment", 1997, ACM SIGPLAN Notices, vol. 32, Issue 3.*
Ted Biggerstaff, "Pattern Matching for Program Generation: A User Manual", 1998, Technical Report MSR-TR-98-55, Microsoft Research.*
Eelco Visser, "Language Independent Traversals for Program Transformations", 2000, Proceedings of the Workshop on Generic Porgramming.*
Elco Visser, "A Survey of Rewritting Strategies in Program Transformation Systems", 2001, Electronic Notes in Theoretical Computer Sciences 57 No. 2.*
Hosoya et al., "Regular Expression Pattern Matching for XML", Department of Computer and Information Science, University of Pennsylvania, 2001, pp. 67-80.

(Continued)

*Primary Examiner* — Lewis A Bullock, Jr.
*Assistant Examiner* — Jue Wang
(74) *Attorney, Agent, or Firm* — Yee & Associates, P.C.; Libby Z. Toub

(57) ABSTRACT

A method, apparatus, and computer instructions are provided by the present invention for a programming framework for easy pattern matching and transformation of intermediate language expression trees. With expression matching and transformation framework (EMTF) of the present invention, pattern matchers may be defined and embedded in a C++ program code in a manner that resembles their intermediate representation. EMTF also provides capabilities for unification, unbinding, transformation, intra-pattern referencing, common operators, creation of pattern objects in a storage pool. With EMTF, less common patterns may be applied against input expressions without repeatedly implementing an algorithm.

3 Claims, 5 Drawing Sheets

OTHER PUBLICATIONS

Dempsey et al., "A Regular Expression Pattern Matching Processor for APL", 1981, pp. 94-100.

Dempsey et al., "A Regular Expression Pattern Matching Processor for APL", The ACM Digital Library, http://portal.acm.org/citation.cfm?id=805341&coll=portal&dl=ACM, pp. 1-4.

sTIREWALT et al., "Generation of Visitor Components that Implement Program Transformations", 2001 Symposium of Software Reusability, Ontario, Canada, Softweare Engineering Notes, Col. 26, No. 3, May, 2001, 1 page.

* cited by examiner

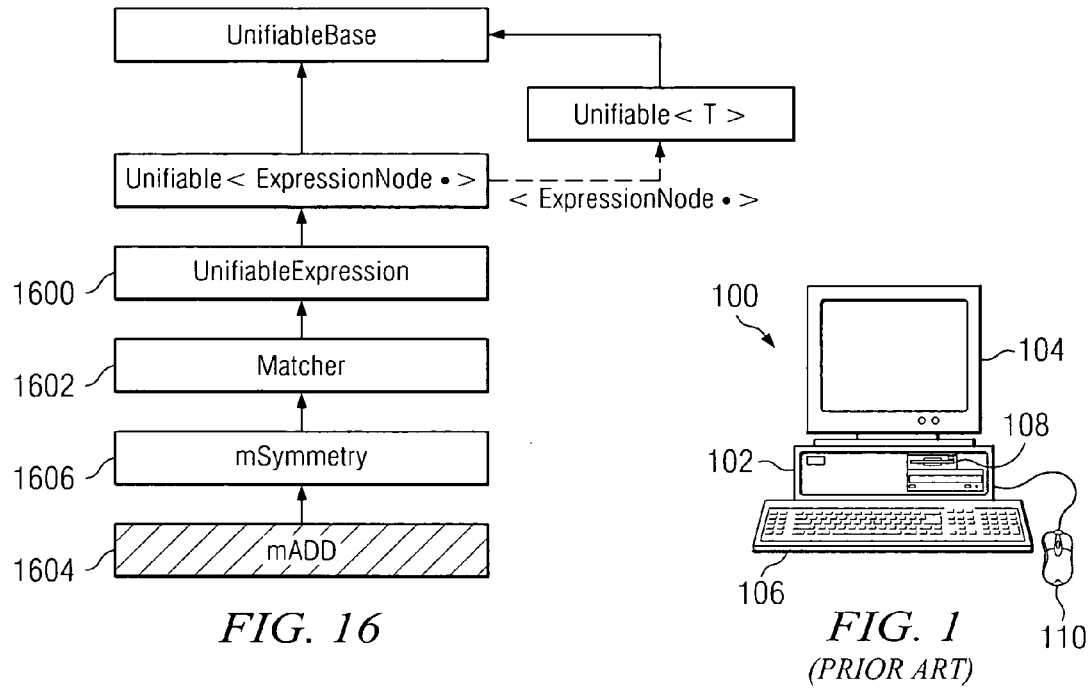
FIG. 16
FIG. 1
(PRIOR ART)
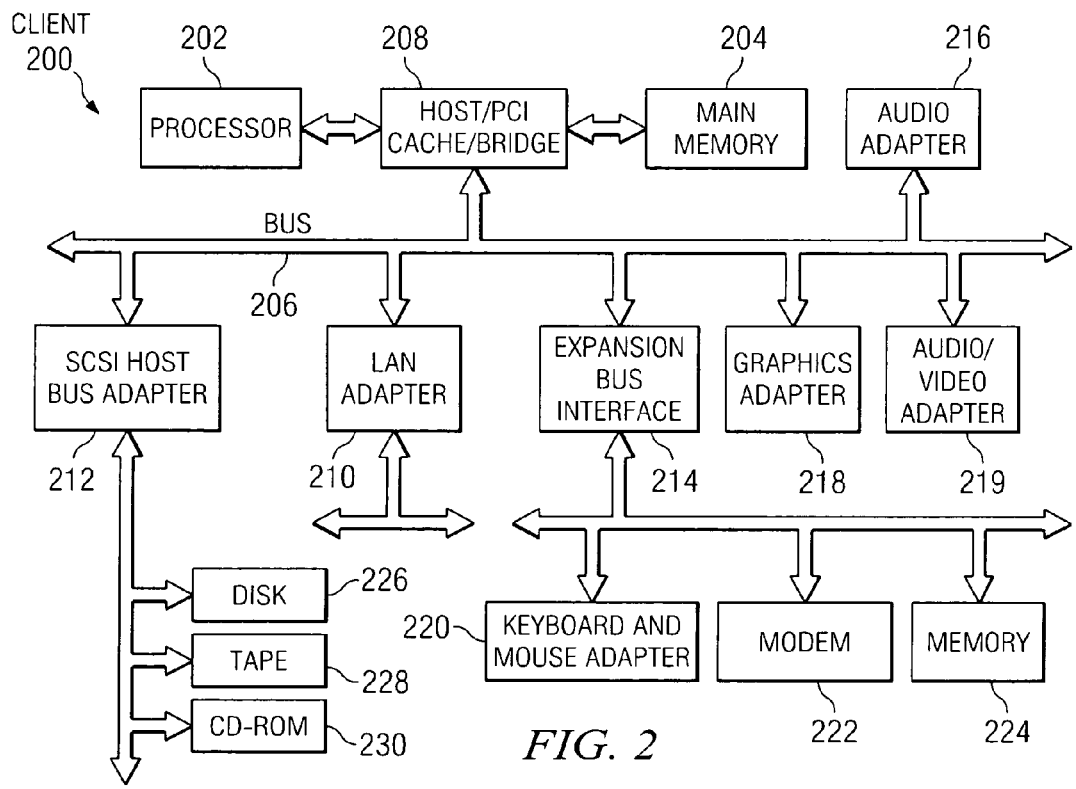
FIG. 2

```
        BU_T *wp = expr->Instruction();              302
        if (wp->buop == USTR) {                                      300
          SymbolTableIndex x = WcodeOracle::GetSymbolIndex(wp);
          ExpressionNode *op0 = expr->Operand(0);
          BU_T *wp0 = op0->Instruction();
          if **(wp0->buop == UADD) {
304         ExpressionNode *op0_0 = op0->Operand(0);
            ExpressionNode *op0_1 = op0->Operand(1);
            BU_T *wp0_0 = op_0->Instruction();
            BU_T *wp0_1 = op_1->Instruction();
306     /  if (wp0_0->buop == ULOD &&
              WcodeOracle::GetSymbolIndex(wp0_0) == x) {
              Literal *one = op0_1->LiteralValue(compUnit, pool);
308     /    if (one && one->IntegerValue() == 1) {
              // do something with x
            }
          } else if (wp0_1->buop == ULOD &&
310           WcodeOracle::GetSymbolIndex(wp0_1) == x) {
            Literal *one = op0_0->LiteralValue(compUnit, pool);
            if (one && one->IntegerValue() == 1) {
              // do something with x
            }
          }
        }
```

FIG. 3

```
410 /  UnifiableSymbol x;                    404         406    408       400
       Unifiable_int one(1);   / 412
402 /  if (match(mSTR(x, mADD(mLDC(one), mLOD(x))), expr, compUnit)) {
         // do something with x
       }
```

FIG. 4

```
       UnifiableSymbol x;                                                  500
       Unifiable_int one(1);
       if (match(mSTR(x, mADD(mLDC(one), mLOD(x) ) | |
                       mINC(mLOD(x), one)), expr, compUnit))  {
         // do something with x
       }
```

FIG. 5

```
void LoopTools::modifyGuard(LoopData &loopData,
                            ExpressionNode *guardExpr)
{
    ...
    UnifiableExpression oldg, newg(guardExpr) ;
    transform(mFJP(oldg >> newg) || mTJP(oldg >> mNOT(newg)),
              loopData.mGuardBranch, proc.mPool,
              &fLoopOpt.CompUnit()) ;
}
```

FIG. 6

```
Unifiable_int32 l; Unifiable_int16 f;
transform(mFJP(oldg,1,f) || mTJP(oldg,1,f)) >> mFJP(newg,1,f),...
```

FIG. 7

```
mMatchBranch br;
transform((br=mFJP(oldg) || br=mTJP(oldg)) >>
          mFJP(newg,br.label,br.flags),...
```

FIG. 8

```
UnifiableExpression e;
Unifiable_int k;
UnifiableSymbol v;
if (match(mADD(e=mMPY(mLDC(k), mLOD(v)), e), expr, compUnit)) {
}
```

FIG. 9

```
1000   Unifiable_int zero(0);
       transform(mTJP(mLDC(zero)) >> mNOP(), ...)

1002   Unifiable_int zero(0);
       transform(mFJP(mLDC(!zero)) >> mNOP(), ...)

1004   mMatchBranch br;
       Unifiable_int zero(0);
       transform(br=mFJP(mLDC(zero)) >> mUJP(br.label, br.flags), ...)

1006   mMatchBranch br;
       Unifiable_int zero(0);
       transform(
           (mTJP(mLDC(zero)) ||
            mFJP(mLDC(!zero))) >> mNOP()) ||
           ((br=mTJP(mLDC(!zero))) ||
            (br=mFJP(mLDC(zero)))) >> mUJP(br.label, br.flags), ...)

mMatchBranch br;
       Unifiable_int zero(0);
       if (!transform(
1008       mTJP(mLDC(zero)) >> mNOP() || mFJP(mLDC(zero)) >>
           mNOP(), ...))
       transform(
           br=mTJP(mLDC(!zero))) >> mUJP(br.label, br.flags) ||
1010       br=mFJP(mLDC(zero)))) >> mUJP(br.label, br.flags), ...)
```

*FIG. 10*

```
                       1103        1104       1105
1100   StoragePool pool;
1101   Matcher *pattern = mLDC(Unifiable_int(0)).newInstance(pool) ;
1102   if (match(*pattern, ...))
```

*FIG. 11*

```
1200   StoragePool pool;                  1202
       UnifiableExpression *pattern =
           new (pool) mLDC(*new (pool) Unifiable_int(0)) ;
       if (match(*pattern, ...))
```

*FIG. 12*

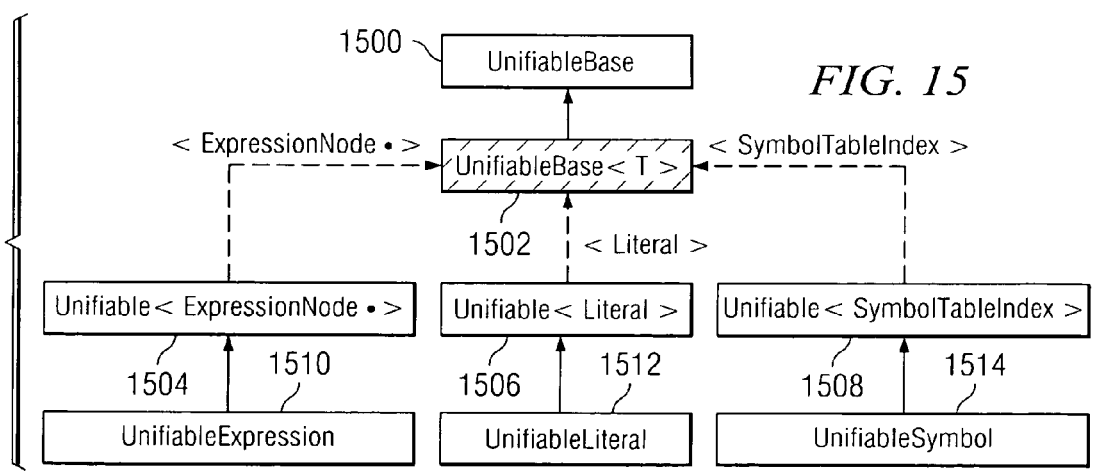

METHOD AND APPARATUS FOR A PROGRAMMING FRAMEWORK FOR PATTERN MATCHING AND TRANSFORMATION OF INTERMEDIATE LANGUAGE EXPRESSION TREES

BACKGROUND OF THE INVENTION

1. Technical Field

The present invention relates to intermediate language expressions in a compiler of a data processing system. In particular, the present invention relates to defining and embedding intermediate language pattern in a compiler of a data processing system. Still more particular, the present invention relates to a programming framework for pattern matching and transformation of intermediate language expression trees in a compiler of a data processing system.

2. Description of Related Art

Typically, when a programmer developed a program, the programmer compiles the program using a compiler, which parses the source program and generates an intermediate representation for the program. An example of a compiler is an IBM XL compiler and an example of a generated intermediate representation is W-code, both of which are available by International Business Machines Corporation.

The intermediate representation provides a stack-based representation of expressions in the program. For example, if the program includes an expression 'x+y', the intermediate representation of the expression becomes '(add (x)(y))' or as follows:

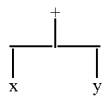

In this example, operator '+' is applied to the stack after arguments y and x.

In another example, if the program includes an express 'x+(y+z)', the intermediate representation of the expression becomes 'add((x) (add (y) (z)))' or as follows:

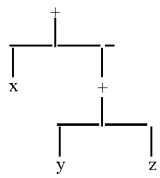

In this example, argument 'y' and 'z' are applied to the stack before operator '+'. The result is then applied to the stack along with argument 'x' before root operator '+' is applied.

Pattern matching of intermediate representation is a common technique used to locate predictable statements and expressions and retrieve specific elements, in order to create derived expressions. An example of a predictable statement or expression may be an expression that has an induction variable, such as 'x++'. Expression 'x++' may be represented in an intermediate representation as '(str x (add (lod x) (ldc 1)))' or as follows:

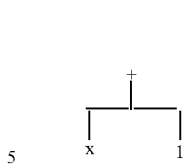

Pattern matching of intermediate representation helps to identify a loop that has such induction variable, which adds a constant value to x for every iteration of the loop. Therefore, pattern matching of intermediate representation is a useful technique in loop optimization.

However, most existing pattern matching code is hand crafted for specific patterns. Thus, a specific pattern matching code is hand-crafted for expression 'x++'. In most cases, pattern matching code only handles certain common expressions and not other less common expressions. While a generalized pattern matching code or pattern matcher for a given pattern may be written, it is cumbersome for the programmer, since backtracking is needed in many cases to handle possible different forms of a matching expression.

In addition, existing pattern matcher code does not provide the capability of easily constructing complex pattern matchers and pattern transformers as objects using grammatical building blocks.

Therefore, the ability to construct and pass these constructed objects as parameters to functions to perform pattern matching and transformation, as well as embedding these constructed objects within a program is desirable. Furthermore, the extensibility of the pattern matcher is desired, such that performance of the compiler may be improved with embedded pattern matchers.

Therefore, it would be advantageous to have an improved method, apparatus, and computer instructions for easy pattern matching of intermediate representation and transformation of intermediate language expression trees, such that pattern matching may be generalized to cover less common expression without much development effort, and can be embedded within a source program.

SUMMARY OF THE INVENTION

The present invention provides a method, an apparatus, and computer instructions for pattern matching and expression transformation of intermediate language expression trees. The present invention allows a pattern to be defined using a generic pattern definition in a computer program. The generic pattern definition may resemble an intermediate representation of the pattern.

If a match statement is detected in the computer program, the pattern is matched with an input expression. The match statement may include a generic pattern definition, an input expression, and a compilation unit object, wherein the generic pattern definition is defined using a plurality of objects. If a transform statement is detected in the computer program, the pattern is matched with an input expression, and an output expression is generated.

The generic pattern definition of the present invention may include a unifiable variable. The present invention determines if the unifiable variable is bound. If the unifiable variable is bound, the value of the unifiable variable is compared to a value of the input expression. However, if the unifiable variable is not bound, the present invention binds the unifiable variable to a value of the input expression. If the present invention determines that a bound unifiable variable fails to match the input expression, the present invention backtracks to unbind the bound unifiable variable.

By backtracking, the present invention determines an age of the unifiable variable, which indicates an order of binding, and compares the age to a predefined age barrier. The age barrier indicates a point to which an algorithm backtracks. If the age is greater than the age barrier, the unifiable variable is unbound by resetting the value of the unifiable variable.

The present invention further determines if the transform statement includes a derivation pattern, which includes a derivation operator, a match pattern, and a generate pattern. If the transform statement does not include a derivation pattern, a copy of the input expression is generated as an output expression. The output expression includes at least one transformed sub-pattern of the pattern in the generic pattern definition.

If the transform statement includes a derivation pattern, the input expression is matched with the match pattern along with any grammatical objects and an output expression is generated for all grammatical objects using the generate pattern. However, if the transform statement includes a derivation pattern, an output expression is generated from the matched pattern with a plurality of objects that are bound to the input expression during the matching step.

If the pattern comprises an assignment operator indicating a reference to a part of the pattern, upon detecting an assignment operator in the statement, a reference is created for the part of the pattern. If the created reference is detected, the present invention refers to the part of the pattern.

The present invention also creates a dynamic pattern, which applies transformation to a set of patterns by creating a storage pool object for each pattern in the set of patterns, applying transformation to each storage pool object without knowledge of a size of the set of patterns, and reusing the storage pool object for future transformations.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 is a pictorial representation of a data processing system in which the present invention may be implemented in accordance with a preferred embodiment of the present invention;

FIG. 2 is a block diagram of a data processing system in which the present invention may be implemented;

FIG. 3 is a diagram illustrating a known embedded pattern matcher in accordance with the prior art;

FIG. 4 is a diagram illustrating exemplary pattern matching using expression matching and transformation programming framework (EMTF) in accordance with the present invention;

FIG. 5 is a diagram illustrating an extended pattern matching using expression matching and transformation programming framework (EMTF) in accordance with the present invention;

FIG. 6 is a diagram illustrating an exemplary transformation of input expressions using expression matching and transformation programming framework (EMTF) in accordance with the present invention;

FIG. 7 is a diagram illustrating an exemplary transformation of input expressions with flag and label information using expression matching and transformation programming framework (EMTF) in accordance with the present invention;

FIG. 8 is a diagram illustrating an exemplary intra-pattern referencing using expression matching and transformation programming framework (EMTF) in accordance with the present invention;

FIG. 9 is a diagram illustrating an exemplary short form definition using intra-pattern referencing in accordance with the present invention;

FIG. 10 is a diagram illustrating an exemplary implementation of branch folding using expression matching and transformation programming framework (EMTF) in accordance with the present invention;

FIG. 11 is a diagram illustrating a short hand to create a pattern matcher in a storage pool using expression matching and transformation programming framework (EMTF) in accordance with the present invention;

FIG. 12 is a diagram illustrating an improved method for creating a pattern matcher in a storage pool using expression matching and transformation programming framework (EMTF) in accordance with the present invention;

FIG. 13 is a diagram illustrating an exemplary implementation of EMTF in accordance with a preferred embodiment of the present invention; and FIG. 14 is a diagram illustrating exemplary W-code constructs implementation in EMTF in accordance with a preferred embodiment of the present invention.

FIG. 15 is a diagram illustrating an exemplary implementation of EMTF in accordance with a preferred embodiment of the present invention; and FIG. 16 is a diagram illustrating exemplary W-code constructs implementation in EMTF in accordance with a preferred embodiment of the present invention.

DETAILED DESCRIPTION OF THE PREFERRED EMBODIMENT

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance.

The processes of the present invention are performed by processor 202 using computer implemented instructions, which may be located in a memory such as, for example, main memory 204, memory 224, or in one or more peripheral devices 226-230.

The present invention provides a method, an apparatus, and computer instructions for pattern matching and transformation of intermediate representation language expression trees. In a preferred embodiment, the present invention provides an expression matching and transformation programming framework (EMTF) for simplifying the task of defining and embedding general intermediate language pattern matchers or transformers. A pattern matcher matches an input expression with a given pattern. In the prior art, each embedded pattern matcher is hand coded for a specific pattern.

With EMTF of the present invention, pattern matchers and transformers are preferably created as C++ objects. These objects may be stored, passed to functions, used, and reused. This allows functions in the program to accept more general patterns. For example, a function such as searchAndTransformPattern may recursively apply a given pattern transformation to a given input expression. With the prior art, a programmer would have to implement the same algorithm for each and every pattern that is applied to the expression. However, with EMTF, since patterns may be defined using C++ objects, the same pattern may be applied recursively without the need to repeat the algorithm. In addition, since the patterns are defined in C++ in a manner resembling their intermediate representation, the program code is now more readable and easily extensible.

Turning now to FIG. 3, a diagram illustrating a known pattern matcher in accordance with the prior art. As shown in FIG. 3, a programmer has to hardcode a pattern matcher, such as pattern matcher 300, to match an input expression with a pattern of 'x=x+1', which is expressed in intermediate representation as (STR x (ADD (LDC 1)(LOD x))).

Pattern matcher 300 first determines whether the expression is a store operation 'STR' 301. Then, the symbol being stored to, in this case 'x', is retrieved from a symbol table 302. After 'x' is retrieved, the pattern matcher determines whether sub-expression 'wp0' is an 'ADD' operation.

If the expression is an 'ADD' expression and it is the same 'x', it divides the two operands into two expression nodes, expression node wp0_0 and wp0_1. For expression node wp0_0, pattern matcher 300 determines if the operand is a 'LOD' operation of 'x' 306. If the operand is a 'LOD' operation of 'x', then it determines if the second expression node, wp0_1, is a 'LDC' operation and if the constant getting loaded is equal to an integer with a value of '1' 308. If the constant loaded is equal to '1', then do something with 'x'. For expression node wp0_1, pattern matcher 300 repeats the same process as expression wp0_0 310.

Turning now to FIG. 4, a diagram illustrating exemplary pattern matching using expression matching and transformation programming framework (EMTF) is depicted in accordance with the present invention. As shown in FIG. 4, pattern matcher 400 implemented using EMTF is much simpler.

In this example, pattern matcher 400 includes a definition of a unifiable symbol of 'x', and a unifiable integer of '1'. Instead of implementing the entire algorithm, like pattern matcher 300 in FIG. 3, pattern matcher 400 includes only a single 'match' statement 402. 'Match' statement 402 takes 3 input parameters: pattern 404, input expression 406, and a compilation unit object 408. Pattern 404 defines a store operation of 'x' using the result of an addition operation, which adds a loaded constant value of 'one' to a loaded symbol of 'x'.

Pattern 404 is preferably defined using C++ objects, such as mSTR for STR, mADD for ADD, mLDC for LDC, and mLOD, for LOD. Thus, pattern 404 resembles its intermediate representation. This makes the program code more readable and extensible. In addition to 'match' statement 402, pattern matcher 400 may include other functions, such as generate and transform, which drives pattern matcher 400 to generate an output expression and transform the input expression. Transform simply performs pattern matching on the input expression before generating an output expression for each object in the pattern.

Furthermore, pattern 404 may also be extended to include an additional way of increasing the value of a variable by 1. Turning now to FIG. 5, a diagram illustrating an extended pattern matching using expression matching and transformation programming framework (EMTF) is depicted in accordance with the present invention. As shown in FIG. 5, pattern 500 is similar to pattern 404 in FIG. 4, except that an 'OR' operation (represented by symbol '‖') is added to 'OR' the addition operation and an 'INC' operation, which increments a loaded symbol of 'x' by 'one'. Thus, with pattern matcher provided by EMTF of the present invention, definition of patterns is simplified.

In addition to simplified pattern matching and transformation, EMTF enables retrieval of elements from input by leveraging unification. Unification is a technique that compares the value of a bound variable with the input if the variable is bound to some value. However, if the variable is not bound, unification binds the input value to the variable. In most cases, the value of a variable is unknown prior to pattern matching the input expression. However, in some cases like bumper statements, the value of the variable may be known prior to pattern matching. A bumper statement is a statement that increases the induction variable by a constant value, for example, x=x+1.

EMTF incorporates unification, which enables programmers to specify the known variable value as part of the pattern.

Turning back to FIG. 4, pattern matcher 400 includes two unification variable, unification symbol 'x' 410, which has no initial binding, and unification integer 'one' 412, which has a constant value of '1'. Since 'x' is unbound, the pattern matcher will bind 'x' to the value of the input. Since 'one' is bound to '1', the pattern matcher will make a comparison of '1' to the input.

In FIG. 4, when mSTR (x, mADD (mLDC(one), mLOD (x))) is matched, 'x' would be bound to the symbol used in the STR operation, and then compared to the symbol used in the LOD operation. By the time the pattern matcher tries to match xLOD(x), x has already been bound. Therefore, if the STR and LOD operations refer to different symbols, pattern matcher fails to match the pattern against the input expression.

Based on the above failure of matching a pattern, EMTF provides unbinding capability to unbind a variable. Suppose that a pattern has an intermediate representation of (ADD e (LOD iv)). A pattern matcher matches this pattern with an input expression of (ADD (LOD civ) (LDC 1)). Using EMTF, the pattern description becomes mADD (e, mLOD (iv)), where e is defined as a UnifiableExpression and iv is defined as a UnifiableSymbol.

When the pattern is matched from left to right, the following procedure occurs:
Matched ADD
   Binding e with (LOD civ)
   Failed to match (LOD iv) with (LDC 1)
   Unbinding e so that e can be bound to second operand instead, since ADD is a commutative operator
   Binding e with (LDC 1)
   Matched LOD
     Binding iv with civ
     Done In the procedure above, LOD iv cannot be bound with LDC 1, since they are different operations. In the first attempt, it is possible to bind e with LOD civ, since e is not as restrictive as LOD iv. But once e is bound, LOD iv may not be bound with LOD civ and since LOD iv cannot be bound to LDC 1, backtracking is necessary to unbind e such that the pattern can be successfully matched.

Therefore, unbinding is a necessity for this model when backtracking. Conversely, backtracking introduces additional complexity that requires unbinding.

For example, in cases where backtracking is employed in multiple levels, not all the bound variables should be-unbound, because some of the bound variables may have been bound prior to the back-tracking point, which means they should remain bound. Therefore, in EMTF, every binding is labeled with an age, which indicates the order of binding. Earlier bindings have a younger or smaller age then later bindings. During backtracking, an age barrier may be set to indicate a point to which the algorithm backtracks. Thus, any binding that has a higher or older age than the age barrier is unbound. In this way, using EMTF unbinding feature, the pattern matcher may control the amount of backtracking to be performed when matching a pattern.

As part of EMTF, transformation may be performed to transform input expressions into derived expressions. Turning now to FIG. 6, a diagram illustrating an exemplary transformation of input expressions using expression matching and transformation programming framework (EMTF) is depicted in accordance with the present invention. As shown in FIG. 6, modifyGuard method 600 takes two input parameters: loopData 602 and input expression guardExpr 604.

ModifyGuard method 600 includes transform statement 606, which matches and generates an output expression for input expression guardExpr 604. Assuming that new guard (newg) expression is a negative check, meaning that the condition evaluates to a FALSE then goto label, when a TJP or true jump is encountered, a NOT is generated around the new guard expression.

In this example, transform statement 606 indicates that if an FJP or false jump is encountered, the old guard expression (oldg) is replaced with a new guardExpr expression. However, if a TJP is encountered, the old expression is replaced with a NOT guardExpr expression.

Turning now to FIG. 7, a diagram illustrating an exemplary transformation of input expressions with flag and label information using expression matching and transformation programming framework (EMTF) is depicted in accordance with the present invention. As shown in FIG. 7, transform statement 700 indicates that if flag and label information is managed by the pattern, the flag and label is also passed to the generated pattern.

Thus, if the old guard (oldg) expression includes a flag and label, which identifies the specific instructions of the expression, the flag and label may be passed to the new guard expression (newg).

In addition to transformation, it may be necessary sometimes for patterns to refer to other parts of the same pattern. EMTF provides an assignment operation (=), which is used to create such reference. Turning now to FIG. 8, a diagram illustrating an exemplary intra-pattern referencing using expression matching and transformation programming framework (EMTF) is depicted in accordance with the present invention.

As shown in FIG. 8, mMatchBranch 800 is a super class of all branch patterns in EMTF, including false jump (FJP) and true jump (TJP) patterns. Thus, mMatchBranch manages the flag and label information for the branch patterns.

By using the assignment (=) operator, br may be defined to unify with the FJP pattern if the input contains an FJP branch, or with the TJP pattern if the input contains a TJP branch. In this example, br is defined to unify FJP and TJP with the input to create a new FJP branch that references br's label and flag information. Assignment translates to unification, which means that if br is bound to a value, the assignment operation becomes a comparison.

Turning now to FIG. 9, a diagram illustrating an exemplary short form definition using intra-pattern referencing is depicted in accordance with the present invention. As shown in FIG. 9, a short form is defined using assignment (=) operator. In this example, pattern matcher 900 tries to match expression:

(ADD (MPY (LDC k)(LOD v)) (MPY (LDC k)(LOD v)))

Using the assignment operator, e is assigned to expression (MPY (LDC k)(LOD v)) 902. It is noted that since mADD handles the comutativeness of the ADD operator, if the expression mMPY (mLDC(k), mLOD(v)) does not match with the input, e will not be bound. Thus, the second e argument 904 may be matched with any expression that is the first argument of ADD. However, the assignment operator (=) translates to unification, therefore, the expression e was bound to also match mMPY (mLDC (k), mLOD(v)).

Turning now to FIG. 10, a diagram illustrating an exemplary implementation of branch folding using expression matching and transformation programming framework (EMTF) is depicted in accordance with the present invention. As shown in FIG. 10, conditional branches where the condition folds to FALSE is transformed into NOPs. Thus, transform statement 1000 is used to transform aft TJP branch to a NOP if the condition folds to a value of 'zero'.

However, for a FJP branch, if the condition folds to any value other than 'zero', the FJP branch should be transformed to a NOP. Thus, as illustrated by transform statement 1002, a not (!) operator is used to create a !zero pattern. If the zero pattern unifies the input, the pattern fails to match. If the zero pattern fails to unify with the input, the pattern matches successfully.

With EMTF, transformation may also be performed on the conditional branches where the conditions fold to TRUE into UJPs. UJP is always jump. As shown in FIG. 10, transform statement 1004 transform FJP branch into a UJP branch if zero pattern unifies with the input.

With the OR (||) operator, transform statements 1000, 1002, and 1004 may be combined into a single transformation pattern as illustrated by transform statement 1006. However, since some compilers may not handle constructors wrapped around in parenthesis well, two transformation patterns may be used, as illustrated by transform statements 1008 and 1010.

In addition to intra-pattern referencing and transformation, EMTF also supports the use of storage pool objects. Thus, memory management may be performed dynamically, such that no reference counting is necessary and expressions may be created into C++ objects inside the pool.

Several ways may be used in EMTF to create pattern objects in a storage pool. Turning now to FIG. 11, a diagram illustrating a short hand form to create pattern matcher in a storage pool using expression matching and transformation programming framework (EMTF) is depicted in accordance with the present invention. As shown in FIG. 11, storage pool object 'pool' 1100 is defined and a matcher named 'pattern' 1102 is defined by creating a mLDC object 1103 using a pool, with a temporary Unifiable_int(0) object 1104 as its argument. When mLDC object 1103 is created using a pool by calling a newInstance method 1105, it will automatically copy all temporary objects, including Unifiable_int(0), into the pool.

While the above technique for creating an EMTF pattern in a storage pool is convenient, performance is affected due to copying of temporary objects. To improve the performance, pooled object is used as illustrated in FIG. 12.

Turning now to FIG. 12, a diagram illustrating an improved method for creating a pattern matcher in a storage pool using expression matching and transformation programming framework (EMTF) is depicted in accordance with the present invention. As shown in FIG. 12, a UnifiableExpression 1200 is defined by instantiating a new Unifiable_int(0) object 1202 using a storage pool. In this way, the Unifiable_int(0) object 1202 is created directly in the pool instead of being copied to it.

It is noted that the coding style of writing new (pool) Object(params) includes the following steps:

a. The 'new' operator of object Object gets called with the pool as a parameter, and asks the pool to allocate memory with the size of the object.

b. The object constructor gets called and with the object mapped to the recently allocated memory.

With the use of storage pool pattern as described above, the pooled object can become persistent and reused, instead of being created every time a pattern is matched. More importantly, creating objects dynamically in a storage pool allows programmers to create dynamic EMTF patterns. For example, IVList contains a list of induction variables for a loop (there can be more than one induction variable). A transformation, such as adding 1 to an inductionVariable reference when unrolling a loop, would look like:

mLOD(iv)>>mADD(mLDC(one), mLOD(iv))

As mentioned above, a searchAndTransformPattern may be used to apply the transformation to the replica of the loop body. However, programmers need to apply the algorithm for each and every induction variable in the loop.

With the pooled pattern, the compiler's performance may be improved by creating a dynamic pattern that transforms all the induction variables, assuming the loop has at least one induction variable.

Turning now to FIG. 13, a diagram illustrating an exemplary creation of dynamic EMTF pattern using storage pool objects is depicted in accordance with a preferred embodiment of the present invention.

As shown in FIG. 13, each induction variable encountered in the IVList 1300 is created directly in the pool. A dynamic EMTF pattern 1302 is then created to replace all references to induction variables in a section of code to add 1 to the induction variables. In this way, compiler performance may be improved, since EMTF pattern 1302 is applied only once on the code instead of multiple times.

In addition, due to the implementation of the UnifiableSymbol::mOr class 1304, which implements the || operator between UnifiableSymbol objects in EMTF, if one of its arguments unifies with a pattern, it would not match the second one. This is called "short circuit logical OR". Therefore, when pattern 1302 is ran against the code section and a match is found for some induction variable, the EMTF implementation would not search for another for a specific LOD operation.

Due to its Object Oriented nature and easy embedding within a program, EMTF is easy to extend to suit specific needs. In the context of the previous example, a specialized EMTF object may be created to accept a list of induction variables, and programmatically match a given symbol expression against that list. In this way, we can combine the ease of using static patterns (i.e. without storage pools) in a loop. Instead of looping over the code multiple times, the EMTF object would be applied to each expression node recursively. This means that the 'looping' effect will only be done at the lowest level, where we can simulate the 'short circuit logical OR' if we find a match in a given expression node.

There are numerous ways to implement the EMTF object. One way is by creating a sub-class of UnifiableSymbol that accepts a list of symbols as a parameter, for example, a UnifiableMultiSymbol class. The unification method of this class is then modified to unify with an input symbol only if it is also in the list of symbols that was initially passed to it. Turning now to FIG. 14, a diagram illustrating an exemplary extended pattern using UnifiableMultiSymbol class is depicted in accordance with a preferred embodiment of the present invention.

As shown in FIG. 14, unifiableMultiSymbol class 1400 accepts a list of symbols, IVList 1404, as a parameter. New 'extended' pattern 1400 is created to match with symbols that are in IVList 1404, and therefore apply the transformation only to them. Since UnifiableMultiSymbol 1400 is defined as a sub-class of UnifiableSymbol, unifiableMultiSymbol 1400 can be used as an argument to mLOD just like a UnifiableSymbol object.

With the special property of matching only against a list of known symbols, only the desired symbols are matched against. In this way, the transformation would be applied correctly.

Turning now to FIG. 15, a diagram illustrating an exemplary implementation of EMTF is depicted in accordance with a preferred embodiment of the present invention. As shown in FIG. 15, EMTF includes a super class, UnifiableBase 1500, which defines the basic unification algorithm and gives every object a data type and length attributes. Unifiable template class 1502 adds the value attribute based on a typed template, including Unifiable<ExpressionNode *> 1504, Unifiable<Literal> 1506, and Unifiable<SymbolTableIndex> 1508. UnifiableExpression 1510, UnifiableLiteral 1512, and UnifiableSymbol 1514 are concrete implementation of Unifiable<ExpressionNode *> 1504, Unifiable<Literal> 1506, and Unifiable<SymbolTableIndex> 1508.

Other subclasses may be added in EMTF to provide even more concrete implementation. For example, a subclass may be added to UnifiableLiteral 1512 to perform a search of integer that is less than a value of '10'. In this way, at compile time, the value of the variable may be evaluated, which helps in unification. By adding more subclasses for special purposes, more constructs are allowed and backtracking capability is thus expanded. In addition, a symbol mapper class may be added to EMTF that utilizes UnifiableSymbol to map one symbol to another symbol.

Turning now to FIG. 16, a diagram illustrating exemplary W-code constructs implementation in EMTF is depicted in accordance with a preferred embodiment of the present invention. As shown in FIG. 16, UnifiableExpression 1600 is similar to UnifiableExpression 1510 in FIG. 15. Pattern matcher 1602 may be implemented by inheriting from UnifiableExpression 1600.

In order to implement a W-code construct, such as mADD 1604 in EMTF, mSymmetry class 1606 may be used, since mADD 1604 is commutative, which is a property handled by mSymmetry class 1606. In addition, EMTF may be extended to include other W-code constructions. For example, a mSymbol class may be added to examine a bit vector of a symbol to determine if that symbol is allowed. This provides a fast search of a symbol by looking at whether the symbol is a member of the bit vector and loads the symbol that is within the set of symbols if the bit vector is equal to '1'.

Thus, the mSymbol class is a more efficient implementation of the UnifiableMultiSymbol as described in FIG. 14, since it will not need to search a list of symbols sequentially. But the example in FIG. 13 show the power inherent in the ease of extending EMTF for special purposes.

In summary, EMTF builds on the idea of a general parser that comprises a set of parsing rules or a grammar. The set of parsing rules are combined into single big parser for a language. The parser may then handle each parsing rule in its own parsing scheme, using a backtracking recursive descent parsing algorithm.

EMTF divides intermediate representation parsing into separate parsing rules, with each intermediate representation operator having its own rule. When defining a pattern, the separate rules are combined into a grammar. Since all rules have been predefined in EMTF, the separate rules maybe combined to form any grammar. This gives the flexibility of defining less common expressions, since each grammar identifies a family of expressions. During pattern matching, the family of expressions defined by the pattern's grammar is matched against the input expression to see if it belongs to the family of expressions.

With intermediate representation expressions already defined as expression trees, defining a grammar for a tree-based expression is easy, since EMTF pattern is a lot like expression trees. By wrapping every little parser in EMTF as an object, and having intra-reference capability for each object to refer to each other, the objects may be combined together into a parser for the pattern. Most of the operators in EMTF, including the assignment and derivation, actually construct specialized objects. In this way, decision relating to the operators may be delayed until after the input expression is matched.

With the unification capability of EMTF, elements may be retrieved and compared from the input. EMTF also provides transformation capability to match the pattern using a match pattern, and generate an output expression using a generate pattern. Most objects simply output the expression that they were bound to during pattern matching. However, specialized objects, such as derivation, will ask the derivation pattern to generate the result instead of the match pattern. Thus, giving a pattern p>>t, a match driver on the derivation object will use the p pattern for matching and a generate driver on the derivation object will use the t pattern for generating the output expression.

For any sub-pattern that does not include a derivation pattern, a copy of the input sub-expression is generated. For example, for a transform statement of mSTR(x, mADD (mLOD(x))>>mLDC(0), e), inpExpr, & CompUnit), mLOD (x)>>mLDC(0) is a generate sub-pattern that generates a (LDC 0) sub-expression if the pattern matches. However, the rest of the pattern generates a copy of whatever it matches against. Thus, the result will be a new STR expression referencing x and a new ADD sub-expression referencing a new (LDC 0) sub-expression and a copy of e sub-expression.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for pattern matching and expression transformation of intermediate language expression trees, the method comprising:
    defining a pattern using a generic pattern definition in a computer program, wherein the pattern comprise an assignment operator indicating a reference to a part of the pattern;
    responsive to detecting a match statement in the computer program, matching the pattern with an input expression, wherein the match statement includes a generic pattern definition, an input expression, and a compilation unit object, wherein the generic pattern definition is defined using a plurality of objects, wherein the generic pattern definition includes a unifiable variable and wherein the matching step comprises:
        determining if the unifiable variable is bound;
        if the unifiable variable is bound, comparing value of the unifiable variable to a value of the input expression;
        if the unifiable variable is not bound, binding the unifiable variable to a value of the input expression; and
        responsive to determining that a bound unifiable variable fails to match the input expression, backtracking to unbind the bound unifiable variable;
        determining an age of the unifiable variable, wherein the age indicates an order of binding;
        comparing the age to a predefined age barrier, wherein the age barrier indicates a point to which an algorithm backtracks;
        if the age is greater than the age barrier, unbinding the unifiable variable by resetting the value of the unifiable variable; and
    responsive to detecting a transform statement in the computer program, matching the pattern with an input expression, and generating an output expression further comprising:
        determining if the transform statement includes a derivation pattern, wherein the derivation pattern includes a derivation operator, a match pattern, and a generate pattern;
        if the transform statement does not include a derivation pattern, generating a copy of the input expression as an output expression;
        if the transform statement includes a derivation pattern, matching the input expression with the match pattern along with any grammatical objects;
        responsive to matching the input expression with the match pattern, generating an output expression for all grammatical objects using the generate pattern;
        if the transform statement includes a derivation pattern, generating an output expression from the matched pattern with a plurality of objects, wherein the plurality of objects are bound to the input expression during the matching step;
        determining if the transform statement indicates that flag and label information are managed by the pattern;
        if the transform statement indicates that flag and label information are managed by the pattern, passing the flag and label information to the generated pattern;
    providing an assignment operator that is used to create a reference by the pattern to a subset of the pattern, wherein a first portion of the pattern is a first particular pattern and a second portion of the pattern is a second particular pattern, and wherein the first portion and the second portion are included in the subset portion;
    using the assignment operator to define the pattern to unify with the first portion if the input expression is a first particular command; and
    using the assignment operator to define the pattern to unify with the second portion if the input expression is a second particular command.

2. A computer program product stored on a recordable-type computer useable medium for
    pattern matching and expression transformation of intermediate language expression trees, the method comprising:
        computer useable program code for defining a pattern using a generic pattern definition in a computer program, wherein the pattern comprise an assignment operator indicating a reference to a part of the pattern;
        computer useable program code for responsive to detecting a match statement in the computer program, matching the pattern with an input expression, wherein the match statement includes a generic pattern definition, an input expression, and a compilation unit object, wherein the generic pattern definition is defined using a plurality of objects, wherein the generic pattern definition includes a unifiable variable and wherein the matching step comprises:
        computer useable program code for determining if the unifiable variable is bound;
        computer useable program code for if the unifiable variable is bound, comparing value of the unifiable variable to a value of the input expression;
        computer useable program code for if the unifiable variable is not bound, binding the unifiable variable to a value of the input expression;
        computer useable program code for responsive to determining that a bound unifiable variable fails to match the input expression, backtracking to unbind the bound unifiable variable
        computer useable program code for determining an age of the unifiable variable, wherein the age indicates an order of binding;
        comparing the age to a predefined age barrier, wherein the age barrier indicates a point to which an algorithm backtracks; and
        computer useable program code for if the age is greater than the age barrier, unbinding the unifiable variable by resetting the value of the unifiable variable; and
        computer useable program code for responsive to detecting a transform statement in the computer program, matching the pattern with an input expression, and generating an output expression further comprising:
        computer useable program code for determining if the transform statement includes a derivation pattern, wherein the derivation pattern includes a derivation operator, a match pattern, and a generate pattern;

computer useable program code for if the transform statement does not include a derivation pattern, generating a copy of the input expression as an output expression;

computer useable program code for if the transform statement includes a derivation pattern, matching the input expression with the match pattern along with any grammatical objects;

computer useable program code for responsive to matching the input expression with the match pattern, generating an output expression for all grammatical objects using the generate pattern;

computer useable program code for if the transform statement includes a derivation pattern, generating an output expression from the matched pattern with a plurality of objects, wherein the plurality of objects are bound to the input expression during the matching step;

computer useable program code for determining if the transform statement indicates that flag and label information are managed by the pattern;

if the transform statement indicates that flag and label information are managed by the pattern, computer useable program code for passing the flag and label information to the generated pattern;

computer useable program code for providing an assignment operator that is used to create a reference by the pattern to a subset of the pattern, wherein a first portion of the pattern is a first particular pattern and a second portion of the pattern is a second particular pattern, and wherein the first portion and the second portion are included in the subset portion;

computer useable program code for using the assignment operator to define the pattern to unify with the first portion if the input expression is a first particular command; and computer useable program code for using the assignment operator to define the pattern to unify with the second portion if the input expression is a second particular command.

3. An apparatus for pattern matching and expression transformation of intermediate language expression trees, comprising:

a bus system;

a communications system coupled to the bus system;

a memory connected to the bus system, wherein the memory includes computer useable program code; and a processing unit coupled to the bus system, wherein the processing unit executes the computer useable program code to define a pattern using a generic pattern definition in a computer program, wherein the pattern comprise an assignment operator indicating a reference to a part of the pattern; to match the pattern with an input expression responsive to detecting a match statement in the computer program, wherein the match statement includes a generic pattern definition, an input expression, and a compilation unit object, wherein the generic pattern definition is defined using a plurality of objects, wherein the generic pattern definition includes a unifiable variable and wherein the matching step comprises determining if the unifiable variable is bound, if the unifiable variable is bound, comparing value of the unifiable variable to a value of the input expression, if the unifiable variable is not bound, binding the unifiable variable to a value of the input expression; and responsive to determining that a bound unifiable variable fails to match the input expression, backtracking to unbind the bound unifiable variable, determining an age of the unifiable variable, wherein the age indicates an order of binding, comparing the age to a predefined age barrier, wherein the age barrier indicates a point to which an algorithm backtracks, if the age is greater than the age barrier, unbinding the unifiable variable by resetting the value of the unifiable variable; and responsive to detecting a transform statement in the computer program, to match the pattern with an input expression, and generating an output expression further comprising determining if the transform statement includes a derivation pattern, wherein the derivation pattern includes a derivation operator, a match pattern, and a generate pattern, if the transform statement does not include a derivation pattern, generating a copy of the input expression as an output expression, if the transform statement includes a derivation pattern, matching the input expression with the match pattern along with any grammatical objects, responsive to matching the input expression with the match pattern, generating an output expression for all grammatical objects using the generate pattern, if the transform statement includes a derivation pattern, generating an output expression from the matched pattern with a plurality of objects, wherein the plurality of objects are bound to the input expression during the matching step; determining if the transform statement indicates that flag and label information are managed by the pattern; if the transform statement indicates that flag and label information are managed by the pattern, passing the flag and label information to the generated pattern; providing an assignment operator that is used to create a reference by the pattern to a subset of the pattern, wherein a first portion of the pattern is a first particular pattern and a second portion of the pattern is a second particular pattern, and wherein the first portion and the second portion are included in the subset portion; using the assignment operator to define the pattern to unify with the first portion if the input expression is a first particular command; and using the assignment operator to define the pattern to unify with the second portion if the input expression is a second particular command.

* * * * *